(12) United States Patent
Elkow

(10) Patent No.: US 6,637,834 B2
(45) Date of Patent: Oct. 28, 2003

(54) VARIABLE-DIAMETER WHEEL APPARATUS FOR MOTOR VEHICLES

(76) Inventor: Douglas B. Elkow, 329 Hedley Way, Edmonton, Alberta (CA), T6R 1V1

( * ) Notice: Subject to any disclaimer, the term of this patent is extended or adjusted under 35 U.S.C. 154(b) by 0 days.

(21) Appl. No.: 09/976,268

(22) Filed: Oct. 15, 2001

(65) Prior Publication Data

US 2003/0071515 A1 Apr. 17, 2003

(51) Int. Cl.$^7$ .................. B60B 11/10; B60B 15/26; B60C 23/10; B60C 29/00
(52) U.S. Cl. .................. 301/40.6; 301/36.1; 301/40.1; 152/415; 152/418
(58) Field of Search ............... 301/13.1, 13.2, 301/36.1, 40.1, 40.2, 40.6, 5.1, 40.3, 38.1, 39.1, 41.1; 152/415, 416, 418, 419; 73/146.4

(56) References Cited

U.S. PATENT DOCUMENTS

| | | | |
|---|---|---|---|
| 1,183,106 A | * 5/1916 | Noonan | 301/40.6 |
| 2,201,632 A | 5/1940 | Roessel | |
| 2,241,849 A | 5/1941 | Fuchs | |
| 2,254,318 A | 9/1941 | Roessel | |
| 2,751,959 A | 6/1956 | Blomquist | |
| 2,765,199 A | 10/1956 | Partin | |
| 3,532,384 A | * 10/1970 | Williams, Jr. | 301/36.1 |
| 4,765,383 A | * 8/1988 | Bott | 152/209.1 |
| 5,505,080 A | * 4/1996 | McGhee | 152/419 |
| 5,600,301 A | * 2/1997 | Robinson, III | 73/146.5 |
| 5,602,524 A | * 2/1997 | Mock et al. | 73/146.5 |
| 5,611,875 A | * 3/1997 | Bachhuber | 152/415 |
| 5,629,874 A | * 5/1997 | Mittal | 152/415 |
| 5,647,927 A | * 7/1997 | Mason | 152/415 |
| 5,788,335 A | 8/1998 | O'Brien | |
| 5,810,451 A | 9/1998 | O'Brien | |
| 5,839,795 A | 11/1998 | Matsuda | |
| 5,928,444 A | * 7/1999 | Loewe et al. | 152/418 |
| 6,022,082 A | 2/2000 | O'Brien | |
| 6,044,883 A | 4/2000 | Noyes | |
| 6,244,666 B1 | * 6/2001 | O'Brien | 301/45 |
| 6,386,252 B1 | * 5/2002 | O'Brien | 301/40.1 |

FOREIGN PATENT DOCUMENTS

| | | | | |
|---|---|---|---|---|
| CH | 645854 B | * | 10/1984 | 301/36.1 |
| DE | 3441-512 A | * | 5/1986 | 301/36.1 |
| DE | 198 58 478 A1 | | 6/2000 | |
| JP | 363112201 A | * | 5/1988 | 301/36.1 |
| JP | 07 156602 A1 | | 6/1995 | |

OTHER PUBLICATIONS

DaimlerChrysler, "The F400 Carving", Internet Website search, www.daimlerchrysler.com/specials/f400/f400_1_e.htm.

* cited by examiner

Primary Examiner—S. Joseph Morano
Assistant Examiner—Jason R. Bellinger
(74) Attorney, Agent, or Firm—Miller Thomson LLP

(57) ABSTRACT

A wheel-and-tire apparatus having at least two coaxially mounted tires is disclosed in which the diameters of one or more of the tires in the apparatus may be adjusted to select the tire or tires which are to be in contact with the road surface. The apparatus facilitates the selective use of tires having different performance characteristics, as may be desired or preferred to suit particular road conditions or vehicle operating conditions. The diameters of particular tires are increased or decreased as required to achieve a desired configuration of relative tire diameters, using tire diameter adjustment means such as one or more pneumatic pumps mounted in association with the apparatus. Sensors monitor selected operational parameters of the vehicle and transmit corresponding signals to a computer which selects an optimal tire configuration to suit the particular combination of operational parameters received from the sensors. The computer then transmits a corresponding signal instructing the tire diameter adjustment means to adjust the diameter of one or more tires in the apparatus as required to achieve the selected optimal tire configuration.

7 Claims, 4 Drawing Sheets

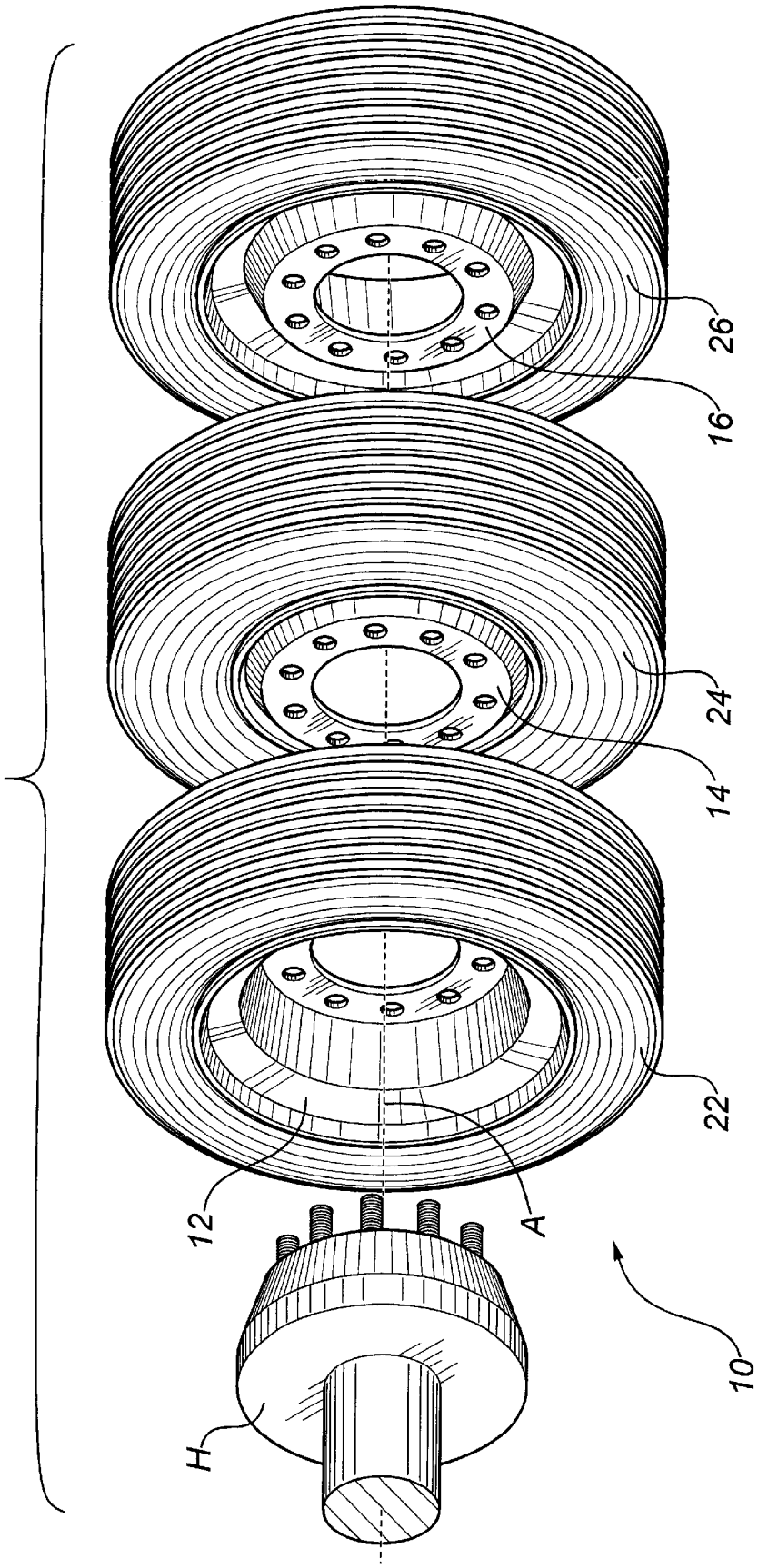

VARIABLE-DIAMETER WHEEL APPARATUS FOR MOTOR VEHICLES

FIELD OF THE INVENTION

The present invention relates to pneumatic-tired wheels for motor vehicles, and relates in particular to multiple-tire wheel assemblies in which the number of tires in contact with the road is selectively variable.

BACKGROUND OF THE INVENTION

The style and size of tire used on a motor vehicle can affect a number of vehicle operating characteristics, so it is common for vehicle tires to be selected on the basis of particular desired performance characteristics. A high-profile tire may be defined as a tire having a comparatively high aspect ratio, or height-to-width ratio, where the height is the distance measured radially from the tire's circumference to the rim opening. A narrow, high-profile tire with a comparatively smooth tread design may be preferred where fuel economy, low road noise, and ride quality are the main operational concerns. However, high-profile tires do not have ideal handling characteristics in terms of steering, acceleration, and braking, so a wider, low-profile tire, with a coarser tread design and perhaps a softer rubber formulation for improved traction, may be preferred for vehicles intended for high-performance handling under aggressive driving conditions. Unfortunately, low-profile tires do not perform as well as high-profile tires in terms of fuel economy, road noise, ride quality, and tire wear.

For these reasons, tire selection has traditionally involved compromise, sacrificing certain desirable performance characteristics for others. Vehicles such as family sedans or mini-vans, which are mainly intended for comparatively sedate driving styles and straight-line highway driving, are typically fitted with softer-riding high-profile tires, while sports sedans and sports cars are commonly fitted with low-profile high-performance tires. Each of these compromises works acceptably when the vehicles in question are being operated according to their primary intended functions, but both suffer from significant drawbacks when operational conditions change. A vehicle riding on typical high-profile tires will be more difficult to handle confidently and safely when travelling fast on narrow, winding roads where tight cornering and hard braking may be required, especially when traction is poor due to rough, wet, or icy road surface conditions. In contrast, a vehicle with low-profile, high-performance tires will generally handle much more responsively under such adverse conditions than if it had high-profile tires, but on the freeways it will give a rougher and noisier ride, with poorer fuel economy.

The prior art discloses numerous attempts to provide vehicle tire systems with variable characteristics to adapt to different operating conditions, including inventions which use multiple-tire assemblies. For example, U.S. Pat. No. 2,751,959, issued to Blomquist on Jun. 26, 1956, discloses a tire-and-wheel assembly having a selectively-inflatable auxiliary tire coaxially disposed between two conventional tires, on a specialized telescoping rim and axle assembly. The auxiliary tire has a unique accordion-like construction. The diameter of the auxiliary tire when uninflated is less than that of the two conventional tires, so the auxiliary tire is not in contact with the road surface when in its uninflated state. When inflated, its diameter expands to match that of the conventional tires, and it also expands laterally, displacing the outboard conventional tire further outboard. Accordingly, inflation of the auxiliary tire greatly increases the total width of the wheel assembly and the total area of tire contact with the road surface, thereby providing improved traction. While this invention may be useful in adapting vehicles for use in some adverse conditions, such as soft or swampy terrain, it has numerous drawbacks including the need for a complicated rim and axle assembly to permit expansion of the auxiliary tire and lateral displacement of the outboard tire. As well, the auxiliary tire is of specialized construction and is correspondingly more expensive than a conventional tire.

In U.S. Pat. No. 5,788,335, issued to O'Brien on Aug. 4, 1998, and in related U.S. Pat. No. 6,022,082, issued to O'Brien on Feb. 8, 2000, a studded, selectively-inflatable auxiliary tire of specialized construction is coaxially disposed between two conventional tires. As in Blomquist, the uninflated diameter of the auxiliary tire in the O'Brien patents is less than that of the conventional tires. Upon inflation, the auxiliary tire expands in diameter (but does not expand laterally as in Blomquist) until it substantially matches the diameter of the conventional tires, such that the studs of the auxiliary tire may engage the road surface. The auxiliary tire thus may be inflated or deflated as desired, to suit particular road conditions. The auxiliary tire of U.S. Pat. No. 5,788,335 is expressly not intended to carry any of the vehicle weight, whereas U.S. Pat. No. 6,022,082 contemplates that all three tires may be load-carrying. However, the two conventional tires carry vehicle loads at all times.

The inventions disclosed in the O'Brien patents cited above are directed primarily to providing enhanced traction on slippery road surfaces, with the means for providing enhanced traction being disengageable when road conditions are favourable. Other prior art references directed toward the same general objective, in the context of either single-tire or double-tire assemblies, include the following:

U.S. Pat. No. 2,201,632, issued May 21, 1940 (Roessel)
U.S. Pat. No. 2,241,849, issued May 13, 1941 (Fuchs)
U.S. Pat. No. 2,254,318, issued Sep. 2, 1941 (Roessel)
U.S. Pat. No. 2,765,199, issued Oct. 2, 1956 (Partin)
U.S. Pat. No. 5,810,451, issued Sep. 22, 1998 (O'Brien)
U.S. Pat. No. 5,839,795, issued Nov. 24, 1998 (Matsuda et al.)
U.S. Pat. No. 6,044,883, issued Apr. 4, 2000 (Noyes)

While the inventions disclosed in these prior art references may be effective in providing increased traction and skid resistance on wet or icy roads, they do not address other desirable objectives such as selectively optimizing ride quality, fuel economy, and general handling characteristics to suit varying road conditions. Furthermore, these inventions typically involve complex traction mechanisms or tires of specialized construction. All of the above-cited prior art inventions embody one or more conventional tires which are in load-bearing contact with the road surface at all times, regardless of whether the inventions' particular traction enhancement means are engaged, and regardless of the road conditions being travelled on.

For the foregoing reasons, there is a need for a vehicle tire system in which performance parameters including traction, acceleration, braking, cornering, ride quality, and fuel economy may be selectively optimized to suit specific road characteristics and surface conditions. In addition, there is a need for a vehicle tire system which meets this need without requiring tires or wheels of highly specialized construction. There is furthermore a need for a vehicle tire system in which performance parameters may be automatically optimized to suit road conditions according to selected criteria, without requiring input or selection from the vehicle operator. The present invention is directed to these needs.

BRIEF SUMMARY OF THE INVENTION

In general terms, the present invention is a wheel-and-tire apparatus, for mounting on a motor vehicle in place of a conventional single-tire or dual-tire assembly. The apparatus includes an assembly of two or more coaxially-mounted tires, plus means for adjusting the diameter of one or more tires in the assembly, which may be adjusted such that all of the tires, or only one or some of the tires, will be in contact with a road surface over which a vehicle is travelling. The apparatus therefore facilitates the selective use of tires having different performance characteristics, as may be desired or preferred to suit particular road conditions or vehicle operating conditions. Adjustment of the relative diameters of the tires may be accomplished by inflating or partially deflating a particular tire or combination of tires, using one or more pneumatic pumps. Alternatively, tire diameter adjustment may be accomplished by mechanical deformation of one or more tires in the assembly.

Although tire diameter adjustment may be controlled manually, the present invention also provides for automatic tire diameter adjustment through use of sensors which are mounted in the vehicle and which sense selected operational parameters; e.g., speed, acceleration, steering input, and braking input. The sensors transmit corresponding signals to a computer which, using a program stored in a memory in the computer, selects an optimal tire configuration to suit the particular combination of operational parameters received from the sensors. The computer then transmits a corresponding signal instructing the tire diameter adjustment means, be it pneumatic pump means or mechanical deformation means or other means, to adjust the diameter of one or more tires in the assembly as required to achieve the selected optimal tire configuration.

In the preferred embodiment, the invention is a wheel-and-tire apparatus having:

(a) a wheel assembly comprising an inboard rim, a central rim, and an outboard rim, plus means for interconnecting the inboard, central, and outboard rims so as to be jointly rotatable about a common axis;

(b) a tire assembly comprising an inboard pneumatic tire, a central pneumatic tire, and an outboard pneumatic tire, mounted on the inboard, central, and outboard rims respectively; and (c) tire diameter adjustment means, whereby the relative diameters of the inboard, central, and outboard tires may be selectively varied.

In the preferred embodiment, the tire assembly may be selectively configured such that the diameter of the central tire is either greater than or substantially equally to the diameter of the inboard and outboard tires. In an alternative embodiment, the tire assembly may be selectively configured such that the diameter of the central tire is either smaller than or substantially equally to the diameter of the inboard and outboard tires. In a further alternative embodiment, the tire assembly may be selectively configured such that the diameter of the central tire is either smaller than, greater than, or substantially equally to the diameter of the inboard and outboard tires. In any of these embodiments, the various possible configurations of the tire assembly may be accomplished by varying the diameter of the central tire only, by varying the diameter of the inboard and outboard tires only, or by varying the diameter of all three tires in the tire assembly.

In the preferred embodiment, variation of the relative diameters of the tires will be effected by at least one pneumatic pump forming part of the tire diameter adjustment means. For example, a single pump may be provided, with an air outlet in fluid communication with the interior of the central tire, and with the capability of pumping compressed air into the central tire or exhausting air out of the central tire, as may be desired. The preferred embodiment also includes sensor and control means for monitoring operational parameters of the motor vehicle, and for activating the tire diameter adjustment means in response to changes in the operational parameters. The sensor and control means comprises:

(a) an actuator associated with the tire diameter adjustment means;

(b) one or more sensors, each sensor being capable of measuring a selected operational parameter of the vehicle, and each sensor having a sensor communication link for carrying signals corresponding to operational parameter measurements made by the sensor;

(c) a computer having a memory, said computer being in communication with each sensor by means of said sensor communication link or links, said computer being for processing operational parameter measurement signals received from the sensor or sensors, and for determining a selected tire assembly configuration corresponding to the operational parameter measurements, in accordance with a program stored in the memory; and (d) an actuator communication link, for carrying from the computer to the actuator a signal corresponding to the selected tire assembly configuration.

In this embodiment, the actuator automatically actuates the tire diameter adjustment means in response to signals received from the computer so as to adjust the tire assembly in accordance with the selected tire assembly configuration.

An alternative embodiment is similar to the preferred embodiment described above, except that the apparatus has only inboard and outboard rims and tires, and no central rim and tire. In this embodiment, the tire assembly may be selectively configured such that the diameter of the inboard tire is either greater than or substantially equally to the diameter of the outboard tire. Alternatively, the tire assembly may be selectively configured such that the diameter of the inboard tire is smaller than the diameter of the outboard tire. In a further alternative embodiment, the tire assembly may be selectively configured such that the diameter of the inboard tire is either smaller than, greater than, or substantially equally to the diameter of the outboard tire. In any of these embodiments, the various possible configurations of the tire assembly may be accomplished by varying the diameter of the inboard tire only, by varying the diameter of the outboard tire only, or by varying the diameter of both the inboard tire and the outboard tire. Operation of the tire diameter adjustment means may be effected in essentially the same way as described previously herein for the preferred embodiment, with modifications as obviously required to suit the two-tire configuration of the apparatus.

BRIEF DESCRIPTION OF THE DRAWINGS

Embodiments of the invention will now be described with reference to the accompanying figures, in which numerical references denote like parts, and in which:

FIG. 1 is an exploded perspective view of the wheel-and-tire apparatus of the preferred embodiment of the present invention.

DETAILED DESCRIPTION OF THE PREFERRED EMBODIMENT

Figure 2A:
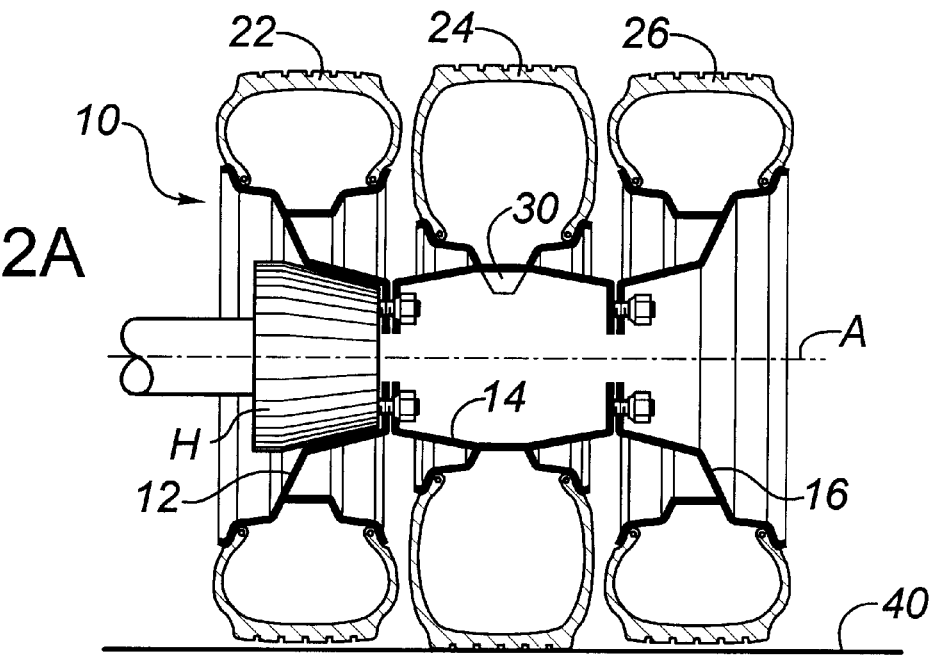
FIG. 2A is a cross-sectional view of the wheel-and-tire apparatus of the preferred embodiment, illustrating the tire assembly of the apparatus in a first configuration.

In the preferred embodiment as illustrated in FIGS. 1, 2A, 2B, and 4, the wheel-and-tire apparatus of the present invention, generally indicated by reference numeral 10, has an inboard wheel rim 12, a central wheel rim 14, and an outboard wheel rim 16, said inboard rim 12, central rim 14, and outboard rim 16 being interconnected so as to be coaxially rotatable about axis A. An inboard tire 22 is mounted on the inboard rim 12, a central tire 24 is mounted on the central rim 14, and an outboard tire 26 is mounted on the outboard rim 16. In the Figures, the central rim 14 is shown as having a diameter smaller than that of the inboard rim 12 and the outboard rim 16, but this relative dimensional relationship is not essential; the concept of the present invention may also be applied to assemblies of rims having various other relative dimensional relationships.

The wheel-and-tire apparatus 10 is mounted onto a wheel hub H of a motor vehicle 60, in place of a conventional single-tire or dual-tire assembly. The wheel-and-tire apparatus 10 may be mounted onto the wheel hub H by means of stud bolts and nuts as illustrated in the Figures, but other means well known in the art may be used for mounting the apparatus, without departing from the fundamental concept of the present invention. Tire diameter adjustment means, conceptually illustrated in FIGS. 2A and 2B and indicated by reference numeral 30, is provided in association with the central tire 24, for increasing or decreasing the diameter of the central tire 24 as may be desired. In the preferred embodiment, the tire diameter adjustment means 30 will be a pneumatic pump mounted in association with the central rim 14, with a compressed air outlet in fluid communication with the interior space inside the central tire 24. With the use of appropriate valving well known in the field of the invention, the pump will be capable of pumping compressed air into the central tire 24, thereby increasing its diameter, or exhausting air from inside the central tire 24, thus decreasing its diameter.

In the preferred embodiment, the pneumatic pump will be a self-contained air compressor which can be mounted to the central rim 14 and which harnesses energy from rotation of the central rim 14 to provide the power needed to operate the compressor. One example of a self-contained air compressor having capabilities of this nature is the SMART PUMP™ manufactured by the Cycloid Company of Pittsburgh, Pa. However, the tire diameter adjustment means 30 can be any pneumatic pump which is capable of inflating or deflating a rotating tire. Alternatively, the tire diameter adjustment means 30 may be a mechanical apparatus which exerts or relieves external or internal forces upon the central tire 24 so as to alter its diameter.

Figure 2B:
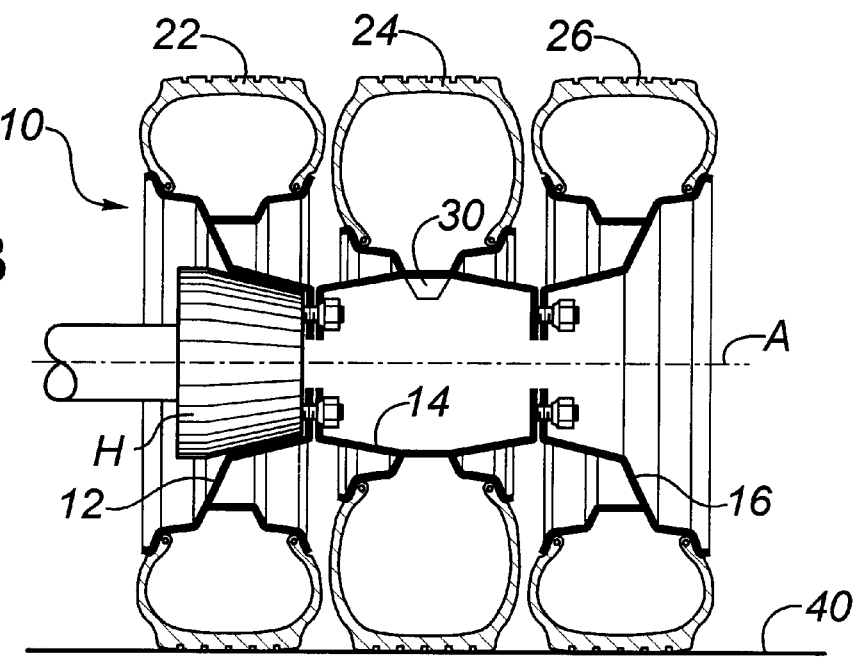
FIG. 2B is a cross-sectional view of the wheel-and-tire apparatus of the preferred embodiment, illustrating the tire assembly of the apparatus in a second configuration.

It will be readily apparent that, whatever type of tire diameter adjustment means 30 is used, when the tire diameter adjustment means 30 is activated to increase the outer diameter of the central tire 24 to a dimension sufficiently greater than the outer diameters of the inboard tire 22 and the outboard tire 26, only the central tire 24 will be in contact with a road surface 40 which the vehicle is travelling upon, as illustrated in FIG. 2A. When the outer diameter of the central tire 24 is adjusted to a dimension substantially equal to the outer diameters of the inboard tire 22 and the outboard tire 26, the inboard tire 22, the central tire 24, and the outboard tire 26 will all be in contact with the road surface 40, as illustrated in FIG. 2B. Although not illustrated in the Figures, it may be clearly seen that if the outer diameter of the central tire 24 is decreased to a dimension sufficiently smaller than the outer diameters of the inboard tire 22 and the outboard tire 26, only the inboard tire 22 and the outboard tire 26 will be in contact with the road surface 40.

It will also be readily seen that variances in the relative outer diameters of the inboard tire 22, the central tire 24, and the outboard tire 26, as described above, may be achieved equally effectively using different variants of the tire diameter adjustment means 30, without departing from the essential concept of the invention. For example, the tire diameter adjustment means 30 could include a pneumatic pump or pumps which increase or decrease the outer diameters of the inboard tire 22 and the outboard tire 26, while the central tire 24 undergoes no change. Alternatively, the tire diameter adjustment means 30 could include two or more pneumatic or pumps which can be operated independently or in combination to increase or decrease the outer diameter of all three tires to achieve a desired configuration.

Figure 3A:
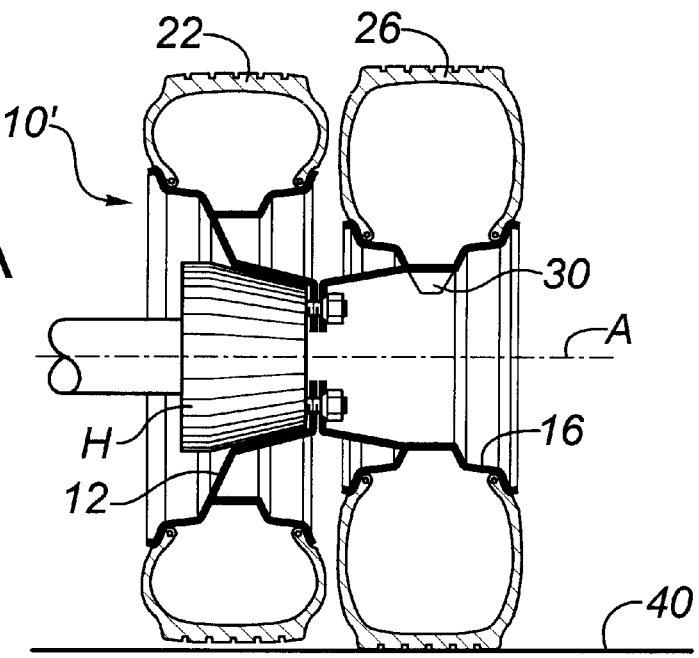
FIG. 3A is a cross-sectional view of the wheel-and-tire apparatus of an alternative embodiment of the invention, illustrating the tire assembly of the apparatus in a first configuration.
Figure 3B:
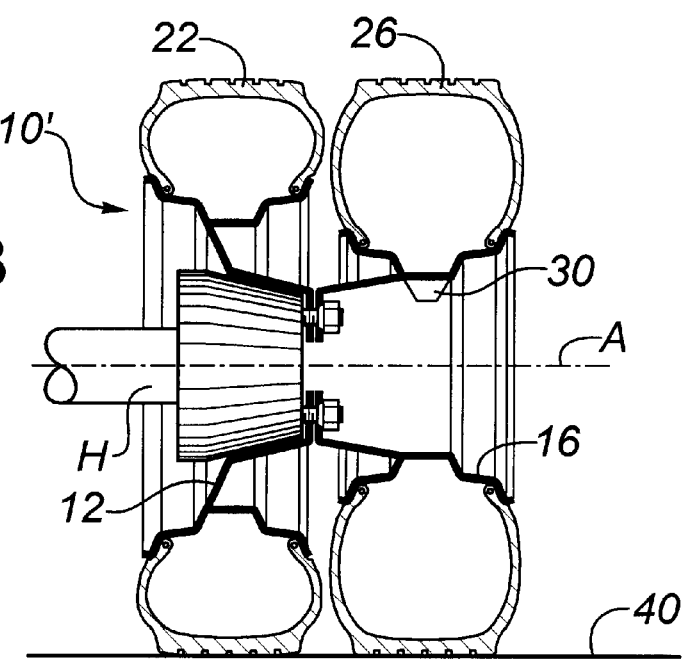
FIG. 3B is a cross-sectional view of the wheel-and-tire apparatus of an alternative embodiment of the invention, illustrating the tire assembly of the apparatus in a second configuration.

Although the preferred embodiment features an assembly of three rims and three tires, the essential concept of the present invention is applicable to any assembly having at least two rims and two tires. For example, as illustrated in FIGS. 3A and 3B, an alternative embodiment of the wheel-and-tire apparatus of the present invention, generally indicated by reference numeral 10', has an inboard wheel rim 12 and an outboard wheel rim 16, said inboard rim 12 and outboard rim 16 being interconnected so as to be coaxially rotatable about axis A, plus an inboard tire 22 mounted on the inboard rim 12 and an outboard tire 26 mounted on the outboard rim 16. Tire diameter adjustment means 30 is provided in association with the outboard tire 26, for increasing or decreasing the diameter of the outboard tire 26 as may be desired.

When the tire diameter adjustment means 30 is activated to increase the outer diameter of the outboard tire 26 to a dimension sufficiently greater than the outer diameter of the inboard tire 22, only the outboard tire 26 will be in contact with the road surface 40, as illustrated in FIG. 3A. When the outer diameter of the outboard tire 26 is adjusted to a dimension substantially equal to the outer diameter of the inboard tire 22, both the inboard tire 22 and the outboard tire 26 will be in contact with the road surface 40, as illustrated in FIG. 3B. Although not illustrated in the Figures, it may be clearly seen that if the outer diameter of the outboard tire 26 is decreased to a dimension sufficiently smaller than the outer diameter of the inboard tire 22, only the inboard tire 22 will be in contact with the road surface 40.

It will be readily seen that variances in the relative outer diameters of the inboard tire 22 and the outboard tire 26, in the alternative embodiment described above, may be achieved equally effectively using different variants of the tire diameter adjustment means 30, without departing from the essential concept of the invention. For example, the tire diameter adjustment means 30 may include a pneumatic pump mounted in association with the inboard tire 22 which can increase or decrease the outer diameter of the inboard tire 22, while the outboard tire 26 undergoes no change. Alternatively, the tire diameter adjustment means 30 may include two pneumatic pumps which can be operated independently or in combination to increase or decrease the outer diameter of the inboard tire 22 and the outboard tire 26 to achieve a desired configuration.

Figure 4:
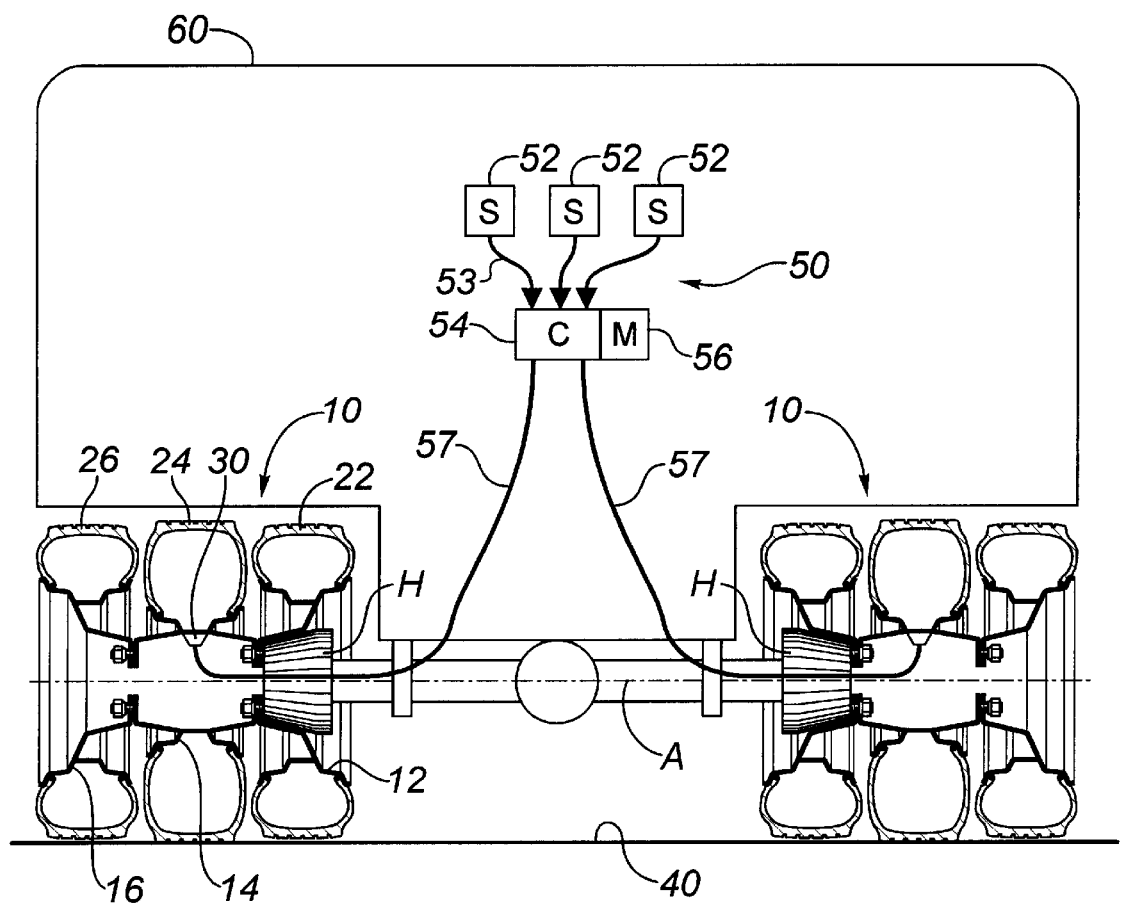
FIG. 4 is a schematic drawing of the preferred embodiment of the invention, conceptually illustrating the sensor and control means of the invention.

In the preferred embodiment, as illustrated in FIG. 4, the invention features sensor and control means 50 which includes one or more sensors 52 mounted in selected locations in the vehicle 60, plus an actuator (not shown) associated with the tire diameter adjustment means 30. In this embodiment, the tire diameter adjustment means 30 may operate automatically, without direct input from the vehicle operator. Each sensor 52 monitors a selected operational parameter for the vehicle 60, such as vehicle speed, acceleration, engine speed, selected transmission gear, tire pressure, tire temperature, steering load, shock absorber load, or braking load. Sensors capable of monitoring these and numerous other parameters are readily available, being commonly used in the telemetry systems for high performance race cars. The sensor and control means 50 also includes a computer 54 with a memory 56, mounted in a convenient location in the vehicle 60. Each sensor 52 is in communication with the computer 54 by means of a sensor communication link, which may be either hard-wired or wireless, as conceptually indicated by reference numeral 53. Each sensor transmits a signal to the computer 54 corresponding to the status of the operational parameter being monitored by the sensor 52. The computer 54, using a program stored in memory 56, processes the data corresponding to the signals received from all of the sensors 52 to determine an optimal configuration of outer diameters of the tires in the wheel-and-tire assembly 10, to suit the operational parameters of the vehicle at the time of processing by the computer 54. By means of an actuator communication link, which may be either hard-wired or wireless, as conceptually indicated by reference numeral 57, the computer 54 then transmits a control signal to the actuator (not shown), which actuates the tire diameter adjustment means 30 as appropriate to achieve the desired configuration of tire diameters.

It will be readily seen that the present invention provides for considerable flexibility with respect to the type of tires which may be used on a vehicle, and with respect to the type of tire which will be in contact with the road at any particular time, according to the preferences of the vehicle operator. For example, in the preferred embodiment, one might choose to use a comparatively narrow soft-riding high-profile tire for the central tire 24, and high-performance low-profile tires for the inboard tire 22 and the outboard tire 26. Using this configuration, the program stored in the memory 56 might provide for differential tire diameter adjustment such that only the central tire 24 will be in contact with the road surface 40 during essentially straight-line driving on main highways, but also such that the high-performance inboard and outboard tires 22 and 26 will be automatically deployed into contact with the road surface 40 in a variety of different operating conditions, such as under brisk acceleration, hard steering, or heavy braking. It will be readily apparent to those skilled in the art that the program stored in memory 56 may be custom-designed to accommodate various possible protocols for operation of the tire diameter adjustment means 30, according to the performance characteristics desired by a particular vehicle operator.

The wheel-and-tire apparatus of the present invention may be fitted at each wheel location of a particular vehicle, or at selected wheel locations only, as may be desired. For example, the apparatus could be used at rear wheel locations only, while using conventional single-tire assemblies at front wheel locations. Alternatively, the apparatus could be used at front wheel locations only, while using conventional single-tire assemblies at rear wheel locations. A separate computer 54 may be provided to control the apparatus at each wheel location. Alternatively, however, a single computer 54 may be used to control the apparatus at more than one location, without departing from the essential concept of the invention.

In an alternative embodiment of the invention, the tire diameter adjustment means 30 may be controlled manually by the operator of the vehicle. Accordingly, the apparatus of the invention may include a control switch (not shown), mounted for convenient access by the operator, whereby the operator may select from among two or more configurations of tire diameters, whereupon the control switch transmits a corresponding signal to the tire diameter adjustment means 30, which in turn adjusts the relative outer diameters of the inboard tire 22, the central tire 24, and the outboard tire 26 as appropriate to achieve the selected configuration.

In accordance with the present invention, a vehicle operator can selectively deploy one or more types of tire at a given wheel location, thereby obtaining an optimized combination of the practical and economic benefits available from each type of tire used. For example, when the apparatus of the invention is fitted with a combination of narrow, high-profile tires and wide, low-profile tires, the invention allows the high-profile tires to be deployed when a soft, comfortable ride and optimal fuel economy are desired. In this configuration, the low-profile tires will rotate without any contact with the road, and therefore will not be subject to wear. As may be warranted by changing operational conditions, the low-profile tires can be deployed instead of or in addition to the high-profile tires to provide improved and safer vehicle handling. Although a combination of high-profile and low-profile tires is referred to in the foregoing example for illustrative purposes, the present invention is adaptable for use with a variety of different tire types.

It will be readily seen by those skilled in the art that various modifications of the present invention may be devised without departing from the essential concept of the invention, and all such modifications are intended to be included in the scope of the claims appended hereto.

The embodiments of the invention in which an exclusive property or privilege is claimed are defined as follows:

1. A wheel-and-tire apparatus comprising:
   (a) a wheel-and-tire assembly comprising an inboard rim, a central rim, and an outboard rim, plus an inboard tire, a central tire, and an outboard tire mounted on said inboard, central, and outboard rims respectively said rims being jointly rotatable about a common axis, and said assembly being mountable on a wheel hub of a motor vehicle;
   (b) tire diameter adjustment means, adapted to selectively introduce compressed air into, or to exhaust air out of, a primary designated tire selected from said inboard, central, and outboard tires, while the wheel assembly is rotating;

(c) an actuator associated with the tire diameter adjustment means;
(d) a computer having a memory;
(e) one or more sensors, each sensor being adapted to be able to measure a selected operational parameter of the vehicle, and each sensor having a sensor communication link for conveying sensor signals, corresponding to measurements made by the sensor, from the sensor to the computer; and
(f) an actuator communication link, for conveying actuation signals from the computer to the actuator;

wherein:

(g) a tire configuration protocol is stored in the computer memory, said protocol comprising selected optimum tire configurations corresponding to selected sensor signals or combinations of sensor signals, said protocol including the tire configurations wherein:
  A. only the central tire is in operatively-effective contact with the road surface;
  B. only the inboard tire and the outboard tire are in operatively-effective contact with the road surface; and
  C. all three tires are in operatively-effective contact with the road surface;
(h) the computer is adapted and programmed:
  A. to receive a sensor signal or signals through the sensor communication link or links;
  B. having reference to the tire configuration protocol, to select a tire configuration corresponding to the received sensor signal or combination of sensor signals; and
  C. to transmit a corresponding actuation signal to the actuator, through the actuator communication link; and
(i) the actuator is adapted to actuate the tire diameter adjustment means, in response to and in accordance with an actuation signal from the computer, so as to inflate or deflate the primary designated tire as necessary to deploy a selected one of the tires, or a selected plurality of the tires, in operatively-effective contact with the road surface, in accordance with the selected tire configuration.

2. The apparatus of claim 1, wherein the operational parameter measured by each Sensor is selected from the group consisting of vehicle speed, acceleration, engine speed, braking load, steering input, steering load, engaged transmission gear, tire pressure, tire temperature, and shock absorber load.

3. The apparatus of claim 1, wherein the primary designated tire is the central tire.

4. The apparatus of claim 1, wherein the primary designated tire is the inboard tire, and wherein the tire diameter adjustment means is further adapted to selectively introduce compressed air into, or to exhaust air out of, both the inboard tire and the outboard tire, while the wheel assembly is rotating, so as to selectively inflate or deflate both the inboard and outboard tires as necessary to selectively deploy all three tires, only the inboard and outboard tires, or only the central tire, in operatively-effective contact with the road surface, in accordance with the selected tire configuration.

5. The apparatus of claim 4, wherein:
(a) the tire diameter adjustment means is further adapted to selectively introduce compressed air into, or to exhaust air out of, the central tire, while the wheel assembly is rotating; and
(b) the actuator is further adapted to actuate the tire diameter adjustment means, in response to and in accordance with an actuation signal from the computer, so as to selectively inflate or deflate the central tire and/or the inboard and outboard tires, so as to selectively inflate or deflate the central tire and/or both the inboard and outboard tires as necessary to selectively deploy all three tires, only the inboard and outboard tires, or only the central tire, in operatively-effective contact with the road surface, in accordance with the selected tire configuration.

6. The apparatus of claim 1, wherein:
(a) the computer further comprises means for transmitting wireless signals;
(b) the actuator further comprises means for receiving wireless signals; and
(c) the actuator communication link is a wireless connection.

7. The apparatus of claim 1, wherein:
(a) at least one of the sensors further comprises means for transmitting wireless signals;
(b) the computer further comprises means for receiving wireless sensor signals; and
(c) each sensor communication link associated sensors having wireless transmission means is a wireless connection.

* * * * *